United States Patent

[11] 3,623,133

[72] Inventor Delroy Ashby
Naperville, Ill.

[21] Appl. No. 875,752
[22] Filed Nov. 12, 1969
[45] Patented Nov. 23, 1971
[73] Assignee Bell Telephone Laboratories, Incorporated
Murray Hill, Berkeley Heights, N.J.

[54] TWO-TERMINAL INDUCTORLESS ELECTRONIC REACTOR
1 Claim, 7 Drawing Figs.

[52] U.S. Cl. .......... 307/230, 333/70 R, 333/80, 307/295
[51] Int. Cl. .......... H03k 3/26
[50] Field of Search .......... 307/230, 295; 333/70 R, 80; 328/167

[56] References Cited

UNITED STATES PATENTS

| | | | |
|---|---|---|---|
| 3,122,714 | 2/1964 | Morris | 307/230 |
| 3,343,003 | 9/1967 | Arseneau | 307/313 |
| 3,375,451 | 3/1968 | Borrelli et al. | 328/167 |
| 3,448,411 | 6/1969 | Patterson | 333/80 |
| 3,506,856 | 4/1970 | Toffler et al. | 307/295 |
| 3,260,950 | 7/1966 | Saari | 330/28 |
| 3,296,546 | 1/1967 | Schneider | 330/28 |
| 3,501,709 | 3/1970 | Uetrecht | 330/28 |

OTHER REFERENCES

" Simulated Inductors Using Differential Amplifiers" page 50 Vol. 3, No. 2 of Electronic Letters

*Primary Examiner*—Donald D. Forrer
*Assistant Examiner*—Harold A. Dixon
*Attorneys*—R. J. Guenther and R. B. Ardis

ABSTRACT: Large values of accurately controlled inductive or capacitive reactance are obtained by using a two-terminal electronic reactor made up of only transistors, resistors, a capacitor and, if desired for protective purposes, a few diodes. In its simplest form, the electronic reactor includes a transistor emitter-follower stage, an impedance network including a series arm and a shunt arm connected between the external terminals of the reactor and the input terminals of the emitter-follower, and a feedback resistor connected from the output of the emitter-follower to one of the reactor external terminals.

INVENTOR
D. ASHBY
BY R. B. Anderson
ATTORNEY

TWO-TERMINAL INDUCTORLESS ELECTRONIC REACTOR

BACKGROUND OF THE INVENTION

This invention relates generally to two-terminal devices for producing electrical reactance and more particularly to two-terminal electronic circuits for producing substantial amounts of reactance without the use of inductors or large capacitors.

In many modern applications, design efforts to reduce the overall size of circuits and systems are frustrated by the bulk of the inductors or capacitors needed to produce large amounts of inductance or capacitance. In a telephone central office, for example, it is customary to use inductors across each line in junctor and trunk circuits in series with the central office battery in order to provide both a low DC impedance for supervisory currents and a high AC shunt impedance. Because of the relatively high inductance required to provide the necessary AC impedance, the inductors can sometimes be as large as all of the remaining junctor or trunk circuit elements combined. Electronic alternatives to inductors are possible, but, when used, such alternatives tend to lack precision, to lack sufficient direct current carrying capacity, or to be short or open circuit unstable.

An object of the present invention is to produce electrical reactance in two-terminal electronic circuits which are physically smaller than inductors or capacitors producing comparable amounts of reactance.

Another and more particular object is to produce such reactance with precision but without introducing either short circuit or open circuit instability.

SUMMARY OF THE INVENTION

In accordance with the invention, a two-terminal electronic reactor includes at least one amplifier having less than unity voltage gain and substantially no phase shift between its input and output terminals, an impedance network including at least a series arm and a shunt arm connected between the external terminals of the reactor and the amplifier input terminals, one of the arms containing a capacitor and the other a resistor, and a feedback resistor connected from the amplifier output to one of the external reactor terminals. The amplifier may take the form of a transistor emitter-follower stage and, to increase the input impedance of the reactor, a second transistor emitter-follower stage may be connected between the external terminals and the impedance network.

In accordance with an important feature of the invention, an inductive reactance is produced between the two external terminals of the reactor by placing the capacitor in the series arm of the impedance network and a capacitive reactance is produced by placing the capacitor in the shunt arm. In this manner, a large inductive reactance may be produced without the use of inductive elements and a large capacitive reactance may be produced without the use of large capacitive elements. Either alternative produces a reactance which can be controlled with a high degree of precision over a substantial range of frequencies, and is unconditionally stable under both short circuit and open circuit conditions. The synthetic inductor can, moreover, be given a large direct current carrying capacity for telephone central office junctor and trunk circuit applications.

DETAILED DESCRIPTION

Figure 1:
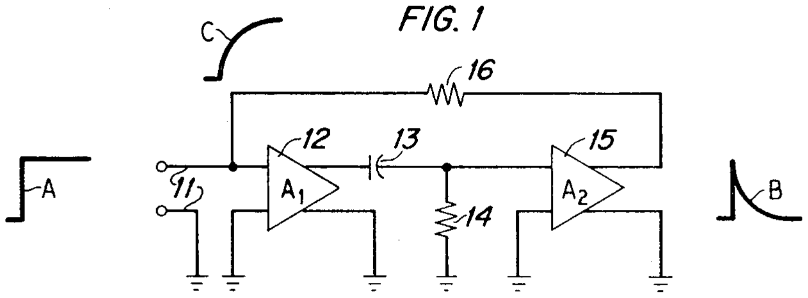
FIG. 1 of the drawing is a block diagram of an electronic inductive reactor embodying the invention.

As shown in FIG. 1 of the drawing, the electronic inductive reactor has a single pair of external terminals 11, one of which is grounded. External terminals 11 are connected to the input side of a first amplifier 12, which has less than unity voltage gain and substantially zero phase shift and may, for example, take the form of a transistor emitter-follower stage. The output side of amplifier 12 is connected to an L-type impedance network made up of a series capacitor 13 and a shunt resistor 14. The output side of the impedance network is, in turn, connected to the input side of a second amplifier 15, which also has less than unity voltage gain and substantially zero phase shift and may, for example, take the form of a transistor emitter-follower stage. Finally, the ungrounded output of amplifier 15 is connected through a feedback resistor 16 to the ungrounded one of external terminals 11.

Over a substantial frequency range, the circuit illustrated in block diagram form in FIG. 1 presents essentially an inductive reactance between external terminals 11. The actual impedance presented at external terminals 11 is given by the expression $$Z_L=\left(\frac{R_1}{1-A_1A_2}\right)\frac{\frac{1}{RC}+j\omega}{\frac{1}{RC(1-A_1A_2)}+j\omega} \qquad (1)$$

where $\omega$ is $2\pi$ times frequency, $R_1$ is the resistance of feedback resistor 16, R is the resistance of shunt network resistor 14, C is the capacity of series network capacitor 13 $A_1$ is the voltage gain of amplifier 12, and $A_2$ is the voltage gain of amplifier 15. As long as the product of $A_1$ and $A_2$ is close to unity, the real part of the denominator of expression (1) predominates and, until very high frequencies are reached, the impedance presented at external terminals 11 has the characteristics of an inductive reactance. The electronic reactance is both open and short circuit stable, may be accurately controlled as to impedance magnitude, and may be provided with a large direct current carrying capacity.

The operation of the synthetic inductor illustrated in FIG. 1 may be appreciated from an intuitive sense by considering the effect of a step voltage A applied to external terminals 11. The impedance network made up of series capacitor 13 and shunt resistor 14 differentiates the step voltage and, as a result, a capacitive reactance characteristic B appears at the output of amplifier 15. This waveshape is subtracted from the step voltage at the input of amplifier 12 by the action of feedback resistor 16 leaving a resultant waveshape C. Waveshape C is, of course, the characteristic response to a step voltage of an inductor.

Figure 2:
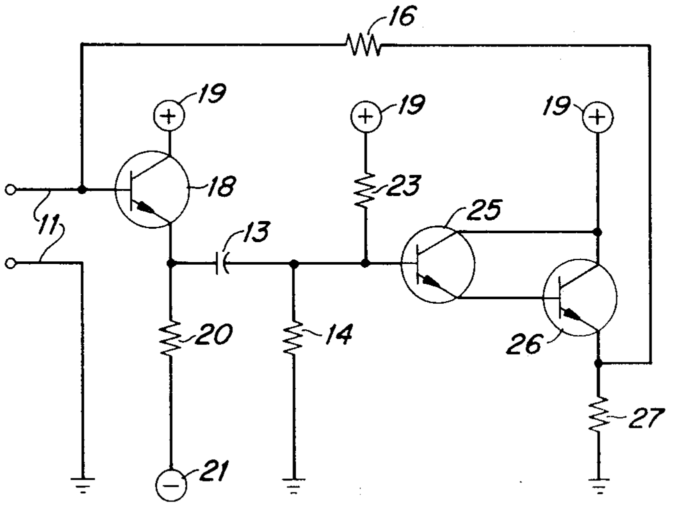
FIG. 2 is a schematic diagram of the embodiment of the invention illustrated in FIG. 1.

A schematic diagram of the electronic inductor shown in block diagram form appears in FIG. 2. As shown, there are two external terminals 11, one of which is grounded and the other of which is connected to the base electrode of NPN transistor 18. The collector electrode of transistor 18 is connected directly to a positive voltage source 19 and the emitter electrode is connected through an emitter load resistor 20 to a negative voltage source 21. Transistor 18 functions as an emitter-follower, with its emitter electrode connected through series network capacitor 13 to the junction between shunt network resistor 14 and a biasing resistor 23. The other end of shunt network resistor 14 is grounded, while the other end of biasing resistor 23 is connected to positive voltage source 19.

In the embodiment of the invention illustrated in FIG. 2, the junction between resistors 14 and 23 is also connected to the base electrode of an NPN transistor 25. Transistor 25 and an NPN transistor 26 are connected as a so-called Darlington pair, with the emitter electrode of transistor 25 connected to the base electrode of transistor 26 and the collector electrodes of both connected directly to positive voltage source 19. The emitter electrode of transistor 26 is connected through an emitter load resistor 27 to ground and, through feedback resistor 16, back to the ungrounded one of external terminals 11.

Figure 3:
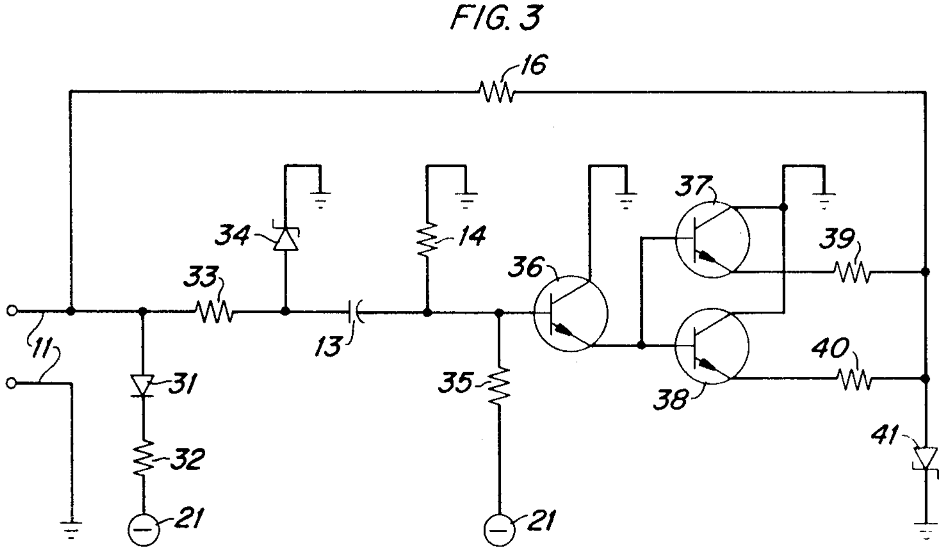
FIG. 3 is a schematic diagram of a modification of the embodiment of the invention illustrated in FIG. 1 in which only a single transistor emitter-follower stage is used.

A modification of the embodiment of the invention shown in FIGS. 1 and 2 is illustrated in schematic form in FIG. 3. The output stage has been split to allow the use of two lower-power transistors to pass the desired output current, the original input stage has been removed to reduce the number of active components, and the circuit is protected against high voltage surges.

In the modified electronic inductor illustrated in FIG. 3, the ungrounded external terminal is connected to the anode of a semiconductor diode 31, the cathode of which is returned to negative voltage source 21 through a resistor 32. The same external terminal is also connected through a resistor 33 to one side of series network capacitor 13 and the anode of a zener diode 34. The cathode of zener diode 34 is grounded, and the other side of series network capacitor 13 and the is connected through shunt network resistor 14 to ground, through a biasing resistor 35 to negative voltage source 21, and directly to the base electrode of an NPN transistor 36. Transistor 36 is connected in the so-called Darlington configuration with a pair of NPN output transistors 37 and 38. The collector electrodes of transistors 36, 37 and 38 are all grounded. The emitter electrode of transistor 36 is connected to the base electrodes of transistors 37 and 38, and the emitter electrodes of transistors 37 and 38 are connected through respective emitter load resistors 39 and 40 to the junction between one end of feedback resistor 16 and the anode of a zener diode 41. The other end of feedback resistor 16 is connected to the ungrounded one of external terminals 11 and the cathode of zener diode 41 is grounded.

Figure 4:
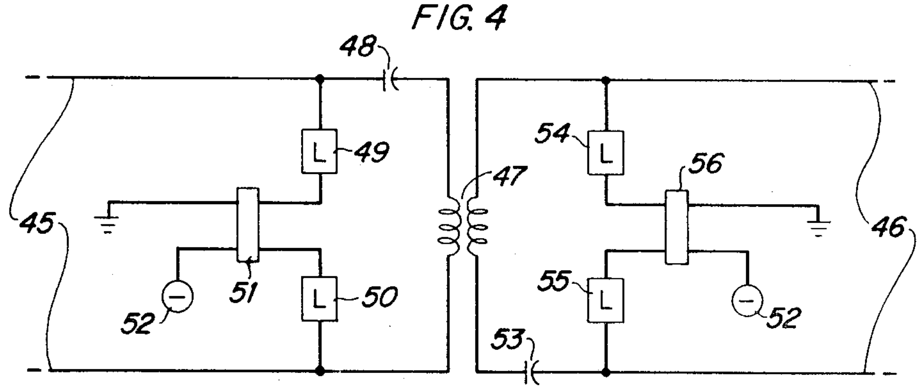
FIG. 4 illustrates a portion of a telephone trunk circuit using the embodiment of the invention shown in FIG. 1.

FIG. 4 of the drawing illustrates an important application for the synthetic inductors shown in FIGS. 1, 2, and 3. Within a telephone central office, junctors and trunk circuits are used to connect a subscriber line to another subscriber line or to an outgoing or incoming trunk. In such arrangements, the junctor or trunk circuit not only must allow two-way voice frequency transmission with minimum signal attenuation, but also must pass central office battery current to operate locally connected subscriber telephone sets and supervise both directions of transmission. In the past, the office battery has normally been connected in series with a pair of inductors in a shunt path across the junctor or trunk circuit to supply the required office battery current and, at the same time, provide both a low impedance for direct supervisory currents and a high AC shunt impedance. Because of the relatively high inductance required, however, the inductors tend to be so large with respect to other circuit components as to frustrate attempts at overall circuit miniaturization. The synthetic inductors shown in FIGS. 1, 2, and 3 represent highly effective solutions to the problem.

The junctor or trunk circuit illustrated in FIG. 4 has two incoming lines 45 and 46 connected to one another by a coupling transformer 47. At the left, a blocking capacitor 48 is connected between one side of line 45 and transformer 47 and a pair of synthetic inductors 49 and 50 are connected across line 45 in series with the central office battery. As shown, inductor 49 is connected from one side of line 45 through the operating coil 51 of a supervisory relay to ground, while inductor 50 is connected from the other side through the same operating coil 51 to the negative terminal 52 of the central office battery. The positive terminal of the central office battery is, of course, grounded. On the right-hand side of FIG. 4, a blocking capacitor 53 is connected between one side of line 46 and transformer 47 and a pair of synthetic inductors 54 and 55 are connected across line 46 in series with the central office battery. As shown, inductor 54 is connected from one side of line 46 through the operating coil 56 of a supervisory relay to ground, while inductor 55 is connected from the other side through the same operating coil 56 to negative terminal 52 of the central office battery.

Figure 5:
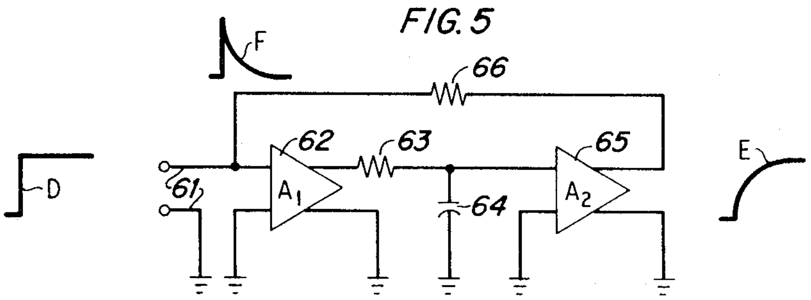
FIG. 5 of the drawing is a block diagram of an electronic capacitive reactor embodying the invention.

A synthetic capacitor embodying the invention is illustrated in FIG. 5 of the drawing. As shown, it has a single pair of external terminals 61, one of which is grounded. External terminals 61 are connected to the input side of a first amplifier 62, which has less than unity voltage gain and substantially zero phase shift and may, for example, take the form of a transistor emitter-follower stage. The output side of amplifier 62 is connected to an L-type impedance network made up of a series resistor 63 and a shunt capacitor 64. The output side of the impedance network is, in turn, connected to the input side of a second amplifier 65, which also has less than unity voltage gain and substantially zero phase shift and may, for example, take the form of a transistor emitter-follower stage. Finally, the ungrounded output of amplifier 65 is connected through a feedback resistor 66 to the ungrounded one of external terminals 61.

Unlike the embodiments of the invention illustrated in FIGS. 1, 2, and 3, the embodiment shown in FIG. 5 presents a capacitance reactance between its external terminals 61. Over a substantial frequency range, however, that capacitive reactance is a much larger capacitive reactance than would be presented by shunt network capacitor 64 alone. The actual impedance presented at external terminal 61 in FIG. 5 is given by the expression $$Z_C = R_1 \frac{\frac{1}{RC} + j\omega}{\frac{1 - A_1 A_2}{RC} + j\omega} \quad (2)$$

where $\omega$ is $2\pi$ times frequency, $R_1$ is the resistance of feedback resistor 66, R is the resistance of series network resistor 63, C is the capacity of shunt network capacitor 64, $A_1$ is the voltage gain of amplifier 62, and $A_2$ is the voltage gain of amplifier 65. As long as the product of $A_1$ and $A_2$ is close to unity, the imaginary part of the denominator of expression (2) predominates and the impedance presented at external terminals 61 has the characteristics of a capacitive reactance, larger than the capacity C by the ratio of $R_1$ to R. The electronic capacitor is both open and short circuit stable and may be accurately controlled as to impedance magnitude.

The operation of the electronic capacitor illustrated in FIG. 5 may be best explained qualitatively by considering the effect of a step voltage D applied to external terminals 61. The impedance network made up of series resistor 63 and shunt capacitor 64 integrates the step voltage and, as a result, an inductive reactance characteristic E appears at the output of amplifier 65. This waveshape is subtracted from the step voltage at the input of amplifier 62 by the action of feedback resistor 66, leaving a resultant waveshape F. As is obvious from inspection, waveshape F is the characteristic response to a step voltage of a capacitor.

Figure 6:
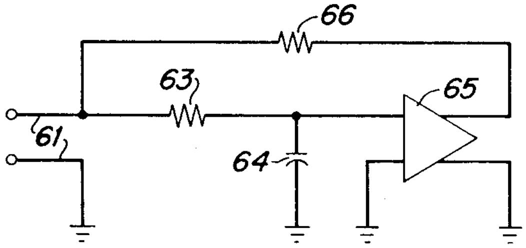
FIG. 6 is a block diagram of a modification of the embodiment of the invention illustrated in FIG. 5 in which only a single amplifier is used.

A modification of the electronic capacitor shown in FIG. 5 is illustrated in block diagram form in FIG. 6. There, the original input stage has been removed to reduce the number of active components. As shown, the ungrounded one of external terminals 61 is connected directly to series network resistor 63. Although the input impedance of the circuit is somewhat reduced, the operation is other wise substantially similar to that of the embodiment of the invention illustrated in FIG. 5.

Figure 7:
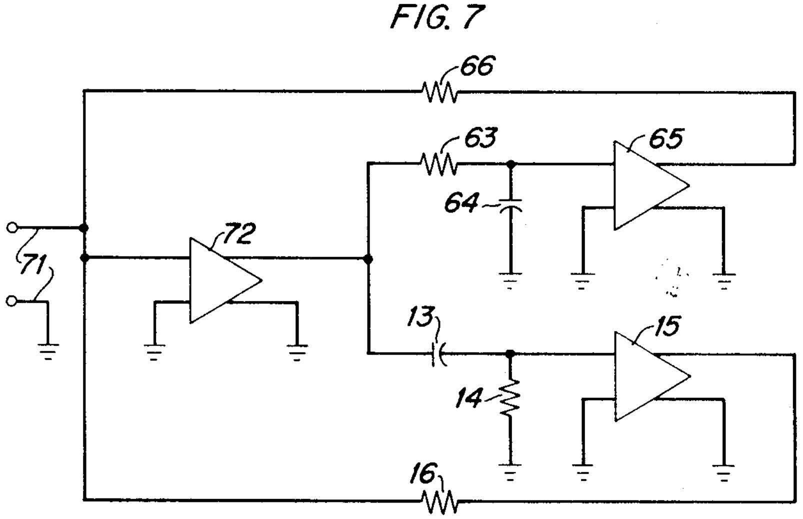
FIG. 7 is a block diagram of an electronic tank circuit using both inductive and capacitive reactors embodying the invention.

The final embodiment of the invention shown in FIG. 7 is an electronic tank circuit, using both an electronic inductor of the type shown in FIG. 1 and an electronic capacitor of the type shown in FIG. 5 in a substantially parallel arrangement. A pair of external terminals 71 are connected to the input side of a common amplifier 72, which has less than unity voltage gain and substantially zero phase shift and may, for example, take the form of a transistor emitter-follower stage. The output side of the common amplifier 72 is connected to two separate paths, one of which forms an electronic inductor and the other of which forms an electronic capacitor.

The lower path from common amplifier 72 in FIG. 7 is the inductive path. It includes an L-type impedance network made up of series capacitor 13 and shunt resistor 14, an amplifier 15, and a feedback resistor 16 connected from the output of amplifier 15 back to the input of common amplifier 72. The upper path in FIG. 7 is capacitive and includes an L-type impedance network made up of series resistor 63, shunt capacitor 64, amplifier 65, and a feedback resistor 66 connected from the output of amplifier 65 back to the input of common amplifier 72. The inductive and capacitive paths in FIG. 7 are functionally like the individual electronic inductor and capacitor shown in FIGS. 1 and 5, respectively, and like numbered elements function in a substantially identical manner.

I claim:

1. An electronic inductor which comprises first and second external terminals; an amplifier having a pair of input terminals, at least one output terminal, substantially no phase shift between said input terminals and said output terminal, and a voltage gain of less than unity; an impedance network connected to form a transmission path between said external terminals and said input terminals and including a first resistor and a capacitor connected in series in said transmission path between said first external terminal and one of said input terminals and a second resistor connected in shunt across said transmission path; a feedback resistor connected from said output terminal to said first external terminal; whereby the waveform appearing at said output terminal is subtracted from the waveform at said first external terminal across said feedback resistor to provide a substantially inductive characteristic between said external terminals; a first zener diode connected in shunt across said transmission path from the junction between said first resistor and said capacitor to said external terminal; and a second zener diode connected from said amplifier output terminal to said second external terminal; both of said zener diodes being poled in the same direction, the forward conducting characteristics of said zener diodes protecting said amplifier against large voltage excursions in one direction across said external terminals, and the reverse conducting characteristics of said zener diodes protecting said amplifier against large voltage excursions in the other direction across said external terminals.

* * * * *